United States Patent [19]

Barth

[11] Patent Number: 4,622,761
[45] Date of Patent: Nov. 18, 1986

[54] DRYING APPARATUS FOR SHEETS OF MATERIAL

[75] Inventor: Peter Barth, Neuwied, Fed. Rep. of Germany

[73] Assignee: Lohmann GmbH & Co KG, Neuwied, Fed. Rep. of Germany

[21] Appl. No.: 773,426

[22] Filed: Sep. 6, 1985

[30] Foreign Application Priority Data

Sep. 10, 1984 [DE] Fed. Rep. of Germany ....... 3433224

[51] Int. Cl.⁴ .............................................. F26B 13/02
[52] U.S. Cl. ......................................... 34/86; 34/155; 34/160; 34/79
[58] Field of Search ...................... 34/155, 160, 79, 86

[56] References Cited

U.S. PATENT DOCUMENTS 3,437,321  4/1969  Wilkinson ............................... 34/79
4,376,342  3/1983  Gavioli .................................... 34/86
4,516,332  5/1985  Takaoda et al. ...................... 34/160

Primary Examiner—Larry I. Schwartz
Attorney, Agent, or Firm—Becker & Becker, Inc.

[57] ABSTRACT

A drying apparatus for sheets of material. The apparatus includes a drying chamber through which a sheet of material which is to be dried is conveyed, and in which the sheet of material is contacted by flowing drying gas. The apparatus also includes a feed line for supplying drying gas to the apparatus, a heater for heating the drying gas, and a withdrawal line for withdrawing the drying gas from the apparatus. The drying chamber includes cup-shaped and rounded-off wall elements which are easily detachably connected to one another. The wall elements have a smooth inner surface. A jacket is disposed around the drying chamber. An intermediate space is defined between the inner surface of the jacket and the outer surface of the wall elements of the drying chamber. Drying gas is introduced through the feed line into the intermediate space. After this drying gas has been heated in the heater, it flows through the drying chamber. A pressure gradient is maintained between the intermediate space, the drying space, and the atmosphere, with the pressure being lowest in said drying chamber means. The hot drying gas in the drying chamber gives off at least some of its heat to the drying gas in the intermediate space. The used drying gas leaves the drying chamber via the withdrawal line.

12 Claims, 2 Drawing Figures

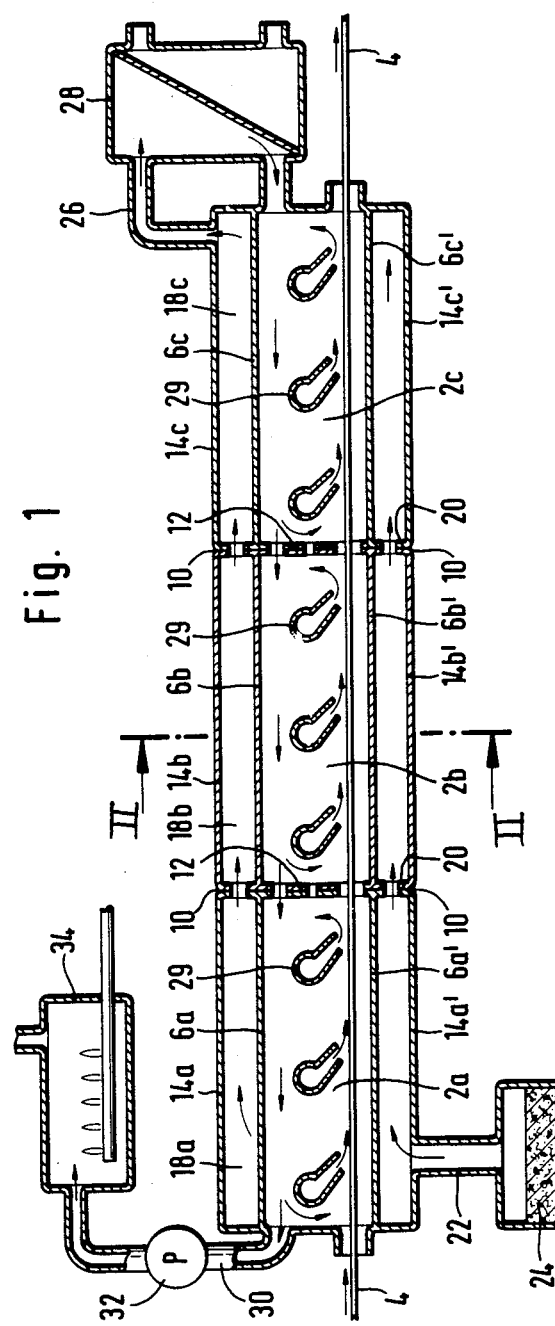

DRYING APPARATUS FOR SHEETS OF MATERIAL

BACKGROUND OF THE INVENTION

1. Field of the Invention

The present invention relates to a drying apparatus for sheets of material, and includes drying chamber means through which a sheet of material which is to be dried is conveyed, and in which the sheet of material is contacted by flowing drying gas; the apparatus also includes a feed line for supplying drying gas to the apparatus, a heater for heating the drying gas, and a withdrawal line for withdrawing the drying gas from the apparatus.

2. Description of the Prior Art

Drying apparatus of this general type are known, and are used, for example, for removing the solvent from solvent-containing pasty coatings for commercial adhesive material and strip-like medicinal bandage material.

During the manufacture of sheets of coated products which are impregnated with medicine (transdermal therapeutic systems, TTS), drying problems occur. Heretofore known constructions of drying apparatus are suitable to only a limited extent for overcoming these problems.

During recent decades, effort has been directed at achieving the greatest possible drying effect with the shortest possible overall length, and with the most accurate control. This is generally achieved by circulation of partial streams of the drying gas within the dryer sections. The great drawback connected herewith is that the inner surfaces of the drying apparatus, which come into contact with the substances, including medicine, which escapes form the sheet of material which is being dried, are unusually complicated and have a large number of dead spaces, undercuts that are not very accessible for cleaning, and even nearly completely closed-off hollow spaces (pipes, blowers, nozzles, etc.). An effective cleaning of the drying apparatus is particularly necessary when the apparatus is used for the successive drying of sheets of material which are coated with different medicines. A contamination of such material with medicine residue from a previous drying charge is not acceptable, especially when the medicines have opposing effects. When smaller charges of sheets of material having special medicines, for which only a limited requirement exists, are to be dried, it is important to be able to undertake the cleaning in a short period of time in order to avoid down times. Furthermore, for reasons of hygiene, residues of medicine cannot be allowed to pass into the atmosphere of the work location. Finally, the sheets of material which are to be dried cannot be allowed to be contaminated by external contaminants, such as dust particles and bacteria.

An object of the present invention is to provide a drying apparatus of the aforementioned general type which enables a rapid and effective drying of sheets of material without contamination from residues of previous charges and/or from contaminants in the external atmosphere; the drying apparatus should also prevent escape of substances from the sheets of material into the atmosphere.

BRIEF DESCRIPTION OF THE DRAWING

These objects, and other objects and advantages of the present invention, will appear more clearly from the following specification in conjunction with the accompanying drawing, in which:

FIG. 1 is a schematic longitudinal section through one embodiment of the inventive apparatus; and FIG. 2 is a cross section taken along the line II—II in FIG. 1.

SUMMARY OF THE INVENTION

The drying apparatus of the present invention is characterized primarily in that the drying chamber means comprises cup-shaped and rounded-off wall elements which are easily detachably connected to one another, and which have a smooth inner surface; the withdrawal line communicates with the drying chamber means for receiving used drying gas therefrom; the drying apparatus is further characterized by a jacket which is disposed around the drying chamber means, with an intermediate space being defined between the inner surface of the jacket and the outer surface of the drying chamber means; after the drying gas which has been introduced via the feed line into the intermediate space has been heated in the heater, accompanied by the maintenance of a pressure gradient between the intermediate space, the drying chamber means, and the outer atmosphere with the pressure being lowest in said drying chamber means, the gas flows through the drying chamber means and leaves the latter via the withdrawal line after giving off at least a portion of its heat to the drying gas in the intermediate space.

The cup-shaped, rounded-off wall elements enable a rapid disassembly of the apparatus for cleaning purposes. The term "rounded-off" refers to the fact that the inner surfaces of the cup-shaped wall elements do not abut one another at too small or sharp of an angle, for example an acute angle or a right angle. The cup-shaped wall elements are also considered "rounded-off" if, for example, the edges are chamferred. After cleaning, the apparatus can again be assembled very rapidly. The cup-shaped wall elements have smooth inner surfaces, i.e. without projections, recesses, and sharp edges in corners. The wall elements can, for example, be interconnected with the aid of clamps, which can be easily loosened. Furthermore, the cup-shaped wall elements can be easily inserted in one another or placed one upon the other. In this connection, as will be clear from the subsequently described reasons, it is not absolutely necessary that the connecting locations be absolutely tight.

The drying chamber is surrounded by a jacket, so that an intermediate space is formed through which the drying gas is introduced. After the gas has passed through a heater, it flows as heated drying gas into the drying chamber, with a pressure gradient being maintained between the intermediate space, the drying chamber, and the outer atmosphere. In other words, the apparatus is under a slight partial vacuum, so that air can always flow in from the outer atmosphere, since the inlet and outlet openings through which the sheet of material is conveyed through the drying chamber, cannot be sealed off.

Since the pressure of the drying gas in the intermediate space is somewhat higher than the pressure of the gas in the drying chamber, some gas can always flow through the connecting locations into the drying chamber, i.e. no contaminated gas can pass out of the drying chamber into the intermediate space. In this way, only the inner surfaces of the cup-shaped wall elements of the drying chamber have to be cleaned.

Cold drying gas flows through the intermediate space, as a result of which the outer walls of the jacket remain relatively cool. Thus, no delays are encountered when the apparatus is to be taken apart for cleaning. Furthermore, no insulating material has to be used, which would otherwise lead to problems during cleaning of the apparatus. The heat balance of the process is improved by the fact that the drying gas in the drying chamber gives off a portion of its heat to the cold drying gas in the intermediate space.

During disassembly or assembly, the cup-shaped wall elements of the drying chamber can be inserted from the end into the tunnel-like jacket. However, the jacket is preferably also comprised of easily detachably interconnected cup-shaped wall elements, so that the disassembly and assembly of the apparatus can proceed more rapidly.

These wall elements are preferably also "rounded off" (in the sense of the previously provided definition), although in this case that is not absolutely necessary, since the jacket does not become nearly as contaminated as does the drying chamber.

As previously mentioned, due to the pressure gradient between the intermediate space and the drying chamber, it is not absolutely necessary that the connection locations be sealed off. However, to improve the sealing, the cup-shaped wall elements of the drying chamber, and possibly also of the jacket, are interconnected via sealing elements. These sealing elements comprise a nonporous material which is capable of being cleaned, since in a porous material, such as foam, contaminants can accumulate which can be removed only with difficulty.

The connection can also comprise metal to metal abutment of the edges of the cup-shaped wall elements. The edges of one wall element could also be geometrically round, and could then be inserted in correspondingly shaped grooves of another wall element.

To improve the heat exchange between the drying chamber and the intermediate space, the cup-shaped wall elements of the drying chamber preferably comprise a material having a high heat conductivity, such as stainless steel. This material can also be easily cleaned.

In order to prevent contamination of the sheet of material which is to be dried from contaminants in the atmosphere, such as dust particles and bacteria, a filter is preferably provided ahead of and upstream from the feed line for the drying gas.

The substances, such as solvent and medicine residue, which escapes from the material which is to be dried, can be burned. To prevent these substances from passing into the atmosphere, an afterburner is preferably provided after, i.e. downstream of, the withdrawal line for the drying gas from the drying chamber.

In order to facilitate the disassembly and assembly of the apparatus, the drying chamber, and possibly also the jacket, is divided into sections, with the length of the cup-shaped wall elements corresponding to the length of the individual sections. Partitions having openings for the sheet of material and for the drying gas are preferably provided between the sections of the drying chamber. In this manner, the drying gas can be guided and swirled in the individual sections in separate circulations, thus improving the drying effect. For this purpose, high-pressure nozzles are preferably also provided in the drying chamber for introducing an additional stream of drying gas at high speed. This additional stream of drying gas is directed onto the sheet of material which is to be dried. Although this additional stream of drying gas constitutes only a small portion of the entire drying gas flow, it is nonetheless sufficient to swirl the drying gas due to its high speed. These nozzles are constructed in such a way that they allow only the smallest volume of air to pass through. The nozzles are subjected to very high pressures, so that the gas in the nozzles has nearly the speed of sound. The quantity of the additional stream of drying gas must be selected in such a way that there results in the drying chamber no excess pressure relative to the atmosphere, so that no contaminated drying gas can escape from the apparatus. The respectively injected additional volume of drying gas passes from one dryer section to the next dryer section in countercurrent flow, and is withdrawn together with the main flow of drying gas at the product-input side of the drying apparatus, where it is fed to the afterburner.

The high-pressure nozzles are preferably embodied as slotted nozzles, with the length of the slots corresponding approximately to the width of the sheet of material which is to be dried. Since the additional stream of drying gas leaves the high-pressure nozzles at very high speed, it also causes a cleaning effect. Furthermore, to facilitate cleaning, the high-pressure nozzles have smooth outer surfaces. The high-pressure nozzles are generally mounted to a high-pressure line which extends in the middle of the drying chamber, and which also serves for supplying the nozzles with compressed drying gas.

DESCRIPTION OF PREFERRED EMBODIMENTS

Referring now to the drawing in detail, the embodiment illustrated in FIGS. 1 and 2 contains a drying chamber which is divided into three sections 2a, 2b, and 2c through which the sheet of material 4 which is to be dried is guided, in the direction of the arrows, in a self-supporting manner.

As can be seen in FIG. 2, the drying chamber has a rectangular cross-section, and is composed of dish or cup-shaped wall elements, at least the inside of the corners of which are rounded-off or chamferred. The upper wall elements are designated with the reference numerals 6a, 6b, and 6c, and the lower wall elements are designated with the reference numerals 6a', 6b', and 6c'. The upper and lower wall elements about one another at the sealing surfaces 8, where possibly occurring gaps or leaks are kept as slight as possible either by precise machining of the sealing surfaces or preferably with the aid of sealing elements (not illustrated). Similar sealing surfaces 10 are also provided on the partitions 12, which are disposed between the chamber sections 2a and 2b on the one hand and 2b and 2c on the other hand, and which are provided with openings for the sheets of material 4. Sealing elements can also be provided between these chamber sections. These sealing elements, as well as the previously mentioned sealing elements, must comprise a non-porous material which is capable of being cleaned. The outer end faces of the chamber sections 2a and 2c are also provided with openings for the sheet of material 4.

Disposed around the drying chamber is a jacket which is formed by the upper dish or cup-shaped wall elements 14a, 14b, and 14c and by the lower dish or cup-shaped wall elements 14a', 14b', and 14c', with the corners of these wall elements also preferably being rounded-off or chamferred. These wall elements are easily detachably connected to one another, and abut at the sealing surfaces 16 (see FIG. 2). As with the sealing surfaces 8 of the wall elements of the drying chamber, here also sealing elements can be provided which also expediently comprise a non-porous material which can be cleaned, although porous sealing elements could also be used at these locations since the wall elements of the jacket do not have to be cleaned so frequently.

The inner walls of the wall elements 14a–14c and 14a'–14c' of the jacket define together with the outer walls of the wall elements 6a–6c and 6a'–6c' of the drying chamber an intermediate space which is divided into the sections 18a, 18b, and 18c. The sections 18a and 18b on the one hand, and the sections 18b and 18c on the other hand, are separated from one another by respective partitions 20, which are provided with openings for the drying gas. Again, sealing elements can be provided between the partitions 20. However, at these locations the partitions can be made of any desired material, and do not necessarily have to be free of pores.

The outer end faces of the wall elements 14a and 14a', and 14c and 14c', are provided with openings for the sheet of material 4.

A feed line 22 for cold drying gas is provided at the wall element 14a' of the jacket. The cold drying gas is first conveyed through a filter 24, so that when it enters the inventive apparatus it is practically free of dust particles and bacteria. The gas flows through the intermediate space, which is divided into the sections 18a–18c, between the drying chamber and the jacket, and is gradually heated by indirect heat exchange with the warm gas which flows through the drying chamber in countercurrent flow. In this manner, the wall elements of the jacket remain fairly cool (for example below 30° C. The drying gas then flows through the line 26 into the heat exchanger 28, where it is heated to the required drying temperature. The heated drying gas flows out of the heat exchanger 28 into the sections 2c, 2b, and 2a of the drying chamber, where it receives solvent vapors and the contaminants from the sheet of material 4, and dries the latter.

In the sections 2a–2c of the drying chamber, high-pressure nozzles 29 are connected to a high-pressure line 27 which extends through the drying chamber in the longitudinal direction. A smaller, additional drying gas stream having nearly the velocity of sound is blown onto the sheet of material 4 which is to be dried through these nozzles 29. As shown in FIG. 2, the nozzles 29 are embodied as slotted nozzles, with the length of the slot corresponding approximately to the width of the sheet of material 4 which is to be dried. With the aid of the nozzles 29, which are fed from the high-pressure line 27, a respective secondary circulation of the drying gas is induced by jet effect in each of the sections 2a–2c; this improves the drying efficiency and the charging of the drying gas with solvent vapors.

The drying gas which has received the solvent vapors, or has been contaminated with medicine, escapes through the withdrawal line 30, which is provided in the outer end wall of the section 2a of the drying chamber, and passes into a vacuum pump 32, with the aid of which a pressure gradient is maintained between the intermediate space 18a–18c and the drying chamber 2a–2c. This prevents contaminated drying gas from passing from the drying chamber into the intermediate space or into the atmosphere. This arrangement furthermore does away with the necessity for having to clean the outer surfaces of the wall elements 6a–6c and 6a'–6c', and of the wall elements 4a–4c and 4a'–4c'.

It is also important that escape of the contaminated drying gas through the openings for the sheet of material 4 into the atmosphere be avoided.

With the aid of a vacuum pump 32, the contaminated drying gas is conveyed into the afterburner 34, in which the contaminants and the solvent vapors are burned. Since air is customarily used as the drying gas, no oxygen has to be added for the combustion. However, if inert gases are used, it is necessary to add oxygen.

It is also possible to remove contaminants and solvent vapors contained in the drying gas stream with the aid of filters (when solid or liquid suspended particles are involved), or by adsorption on adsorption agents, or by condensation (when gaseous or vaporous substances are involved). Combinations of these cleaning methods can also be used. For example, it may be expedient to filter out the solid and liquid suspended particles, condensate out a fraction of the solvent vapors or adsorb a portion thereof on an adsorption agent (if valuable solvent is involved), and burn the remaining solvent vapors.

If the drying apparatus is to be cleaned, which is necessary at any time that a sheet of material must be dried that contains a different medicine than the previous charge, the wall elements 14a–14c and 14a'–14c' of the jacket are first removed by loosening the connecting elements (for example clamps) between the wall elements. The removal of the wall elements of the jacket can be effected practically without any loss of time, because they are relatively cool. After removal of the wall elements of the jacket, the wall elements 6a–6c and 6a'–6c' are removed in the same manner. The nozzles 29 are now exposed, and can be cleaned. Normally, only the inner surfaces of the wall elements 6a–6c and 6a'–6c' have to be cleaned; it is not necessary in each case to clean the wall elements 14a–14c and 14a'–14c' of the jacket.

The assembly of the apparatus is effected in the reverse sequence.

The present invention is, of course, in no way restricted to the specific disclosure of the specification and drawing, but also encompasses any modifications within the scope of the appended claims.

What I claim is:

1. A drying apparatus for sheets of material, said apparatus including drying chamber means through which a sheet of material which is to be dried is conveyed, and in which said sheet of material is contacted by flowing drying gas; said apparatus further including a feed line for supplying drying gas to said apparatus, a heater for heating said drying gas, and a withdrawal line for withdrawing said drying gas from said apparatus; the improvement comprising:

a drying chamber means comprised of cup-shaped and rounded-off wall elements which are easily detachably connected to one another, and which have a smooth inner surface and an outer surface; said withdrawal line communicates with said drying chamber means for receiving used drying gas therefrom;

a jacket which is disposed around, and is spaced from, said drying chamber means; said jacket has an inner surface which, together with said outer surface of said wall elements of said drying chamber means, define between them an intermediate space, with said feed line communicating with said intermediate space to supply said drying gas thereto;

conduit means connecting said intermediate space to said heater to supply said drying gas to the latter; and further conduit means connecting said heater to said drying chamber means to supply heated drying gas to said drying chamber means, in which at least a portion of the heat of said drying gas is given off, via said wall elements, to said drying gas in said intermediate space; a pressure gradient is maintained between said intermediate space, said drying chamber means, and the atmosphere, with the pressure being lowest in said drying chamber means, said jacket also comprising cup-shaped wall elements which are easily detachably connected to one another, said drying chamber means being divided into sections, with said wall elements of said drying chamber means having respective lengths which correspond to the length of individual ones of said sections of said drying chamber means, said jacket also being divided into sections, with said wall elements of said jacket also having respective lengths which correspond to the length of individual ones of said jacket sections.

2. A drying apparatus according to claim 1, which includes sealing elements, of non-porous material which is capable of being cleaned, interposed between interconnected ones of said wall elements of said drying chamber means.

3. A drying apparatus according to claim 2, which includes further sealing elements interposed between interconnected ones of said wall elements of said jacket.

4. A drying apparatus according to claim 1, in which said wall elements of said drying chamber means comprise a material having a high heat conductivity.

5. A drying apparatus according to claim 1, which includes a filter which communicates with, and is connected upstream from, said feed line for drying gas.

6. A drying apparatus according to claim 5, which includes an afterburner for combustible substances which escape from said sheet of material which is to be dried; said afterburner communicates with, and is connected downstream from, said withdrawal line.

7. A drying apparatus for sheets of material, said apparatus being operated at temperatures around 100° C. or below, depending upon type of solvent employed, and including drying chamber means through which a sheet of material which is to be dried is conveyed, and in which said sheet of material is contacted by flowing drying gas; said apparatus further including a feed line for supplying drying gas to said apparatus, a heater for heating said drying gas, and a withdrawal line for withdrawing said drying gas from said apparatus; the improvement therewith comprising:

a drying chamber means comprised of cup-shaped and rounded-off wall elements which are easily detachably connected to one another so that said drying chamber means is more easily accessible, and which have a smooth inner surface and an outer surface for easier cleaning of said drying chamber means; said withdrawal line communicates with said drying chamber means for receiving used drying gas therefrom;

a jacket which is disposed around, and is spaced from, said drying chamber means; said jacket has an inner surface which, together with said outer surface of said wall elements of said drying chamber means, define between them an intermediate space, with said feed line communicating with said intermediate space to supply said drying gas thereto;

conduit means connecting said intermediate space to said heater to supply said drying gas to the latter; and further conduit means connecting said heater to said drying chamber means to supply heated drying gas to said drying chamber means, in which at least a portion of the heat of said drying gas is given off, via said wall elements, to said drying gas in said intermediate space; a pressure gradient is maintained between said intermediate space, said drying chamber means, and the atmosphere, with the pressure being lowest in said drying chamber means to avoid encountering of danger of pollution of atmosphere with solvent vapors and with solid particles entrained with solvent vapors due to removal of solvents in the drying apparatus, said wall elements of said drying chamber means comprising a material having a high heat conductivity that assures a good heat transfer between said drying chamber means and said jacket.

8. A drying apparatus according to claim 7, in which said jacket also comprises cup-shaped wall elements which are easily detachably connected to one another.

9. A drying apparatus according to claim 8, in which said drying chamber means is divided into sections, with said wall elements of said drying chamber means having respective lengths which correspond to the length of individual ones of said sections of said drying chamber means.

10. A drying apparatus according to claim 1, which includes partitions disposed between said sections of said drying chamber means, with said partitions being provided with openings for said sheets of material, and for drying gas.

11. A drying apparatus according to claim 1, in which said drying chamber means is provided with high-pressure nozzles for directing against said sheet of material which is to be dried an additional stream of drying gas at high speed.

12. A drying apparatus according to claim 11, in which said high-pressure nozzles are embodied as slotted nozzles, the slots of which have a width corresponding approximately to the width of said sheet of material which is to be dried.

* * * * *